US008132728B2

(12) United States Patent  
Dwinell et al.

(10) Patent No.: US 8,132,728 B2
(45) Date of Patent: Mar. 13, 2012

(54) PARCEL DIMENSIONING MEASUREMENT SYSTEM AND METHOD

(75) Inventors: John Dwinell, Wrentham, MA (US); Long Xiang Bian, Sharon, MA (US)

(73) Assignee: Sick, Inc., Minneapolis, MN (US)

( * ) Notice: Subject to any disclaimer, the term of this patent is extended or adjusted under 35 U.S.C. 154(b) by 556 days.

(21) Appl. No.: 11/732,541

(22) Filed: Apr. 4, 2007

(65) Prior Publication Data
US 2008/0245873 A1   Oct. 9, 2008

(51) Int. Cl.
G06K 7/00 (2006.01)
G06K 7/10 (2006.01)
G06K 15/10 (2006.01)
G06K 9/00 (2006.01)
G01C 5/00 (2006.01)
G01B 11/22 (2006.01)

(52) U.S. Cl. .......... 235/454; 235/440; 235/462.21; 356/3.1; 356/627; 382/101; 382/102

(58) Field of Classification Search .......... 235/454, 235/440, 462.41; 382/101, 102
See application file for complete search history.

(56) References Cited

U.S. PATENT DOCUMENTS

| 4,761,685 | A |   | 8/1988 | Asaida et al. |
|---|---|---|---|---|
| 4,972,494 | A |   | 11/1990 | White et al. |
| 5,140,418 | A |   | 8/1992 | Rivamonte |
| 5,535,127 | A | * | 7/1996 | Uno et al. ............. 705/406 |
| 5,737,438 | A |   | 4/1998 | Zlotnick et al. |
| 5,760,829 | A |   | 6/1998 | Sussmeier |
| 5,768,446 | A | * | 6/1998 | Reasoner et al. ........... 382/304 |
| 5,770,864 | A |   | 6/1998 | Dlugos |
| 5,820,547 | A |   | 10/1998 | Strobl et al. |
| 6,009,189 | A |   | 12/1999 | Schaack |
| 6,064,629 | A |   | 5/2000 | Stringer et al. |
| 6,064,759 | A |   | 5/2000 | Buckley et al. |
| 6,278,460 | B1 |   | 8/2001 | Myers et al. |
| 6,424,735 | B1 | * | 7/2002 | Freifeld ................. 382/154 |
| 6,501,554 | B1 |   | 12/2002 | Hackney et al. |
| 6,606,395 | B1 |   | 8/2003 | Rasmussen et al. |
| 6,845,914 | B2 |   | 1/2005 | Bian et al. |
| 6,851,610 | B2 |   | 2/2005 | Knowles et al. |
| 6,980,690 | B1 |   | 12/2005 | Taylor et al. |

(Continued)

FOREIGN PATENT DOCUMENTS

WO    WO 03/102501 A1    12/2003

OTHER PUBLICATIONS

Quddus, A; and Fahmy, M.M., "Faste Wavelet-Based Corner Detection Technique" Electronic Letters vol. 35 Issue No. 4, Feb. 1999, pp. 287-288.*

(Continued)

*Primary Examiner* — Michael G Lee
*Assistant Examiner* — Laura Gudorf
(74) *Attorney, Agent, or Firm* — Iandiorio Teska & Coleman, LLP

(57) ABSTRACT

A parcel dimension measurement system includes image sensors oriented to image a parcel, an imaging subsystem configured to stitch together outputs of the image sensors to produce at least one two-dimensional image comprised of a plurality of pixels, and a general dimension subsystem including general parcel dimension information. A fine dimensioning subsystem is configured to determine dimension measurements of the parcel using the at least one two-dimensional image and the general parcel dimension information.

41 Claims, 11 Drawing Sheets

U.S. PATENT DOCUMENTS

| | | |
|---|---|---|
| 6,988,660 B2 * | 1/2006 | Tsikos et al. .................. 235/454 |
| 6,992,696 B1 | 1/2006 | Albertelli |
| 7,118,042 B2 | 10/2006 | Moore et al. |
| 7,142,726 B2 | 11/2006 | Ziegler et al. |
| 7,233,682 B2 | 6/2007 | Levine |
| 7,277,187 B2 * | 10/2007 | Smith et al. .................. 356/601 |
| 2002/0114508 A1 | 8/2002 | Love |
| 2002/0118874 A1 | 8/2002 | Chung et al. |
| 2002/0163573 A1 | 11/2002 | Bieman et al. |
| 2003/0144800 A1 | 7/2003 | Davis et al. |
| 2004/0175052 A1 | 9/2004 | Bian et al. |
| 2005/0259847 A1 | 11/2005 | Genc et al. |
| 2007/0002143 A1 | 1/2007 | Elberbaum |
| 2007/0181685 A1 * | 8/2007 | Zhu et al. ..................... 235/454 |
| 2008/0156882 A1 | 7/2008 | Tsikos et al. |

OTHER PUBLICATIONS

U.S. Appl. No. 11/732,546, filed Apr. 4, 2007, Dwinell et al.

Quddus, A; and Fahmy, M. M., "Fast Wavelet-Based Corner Detection Technique" Electronic Letters vol. 35 Issue No. 4, Feb. 1999, pp. 287 - 288.

* cited by examiner

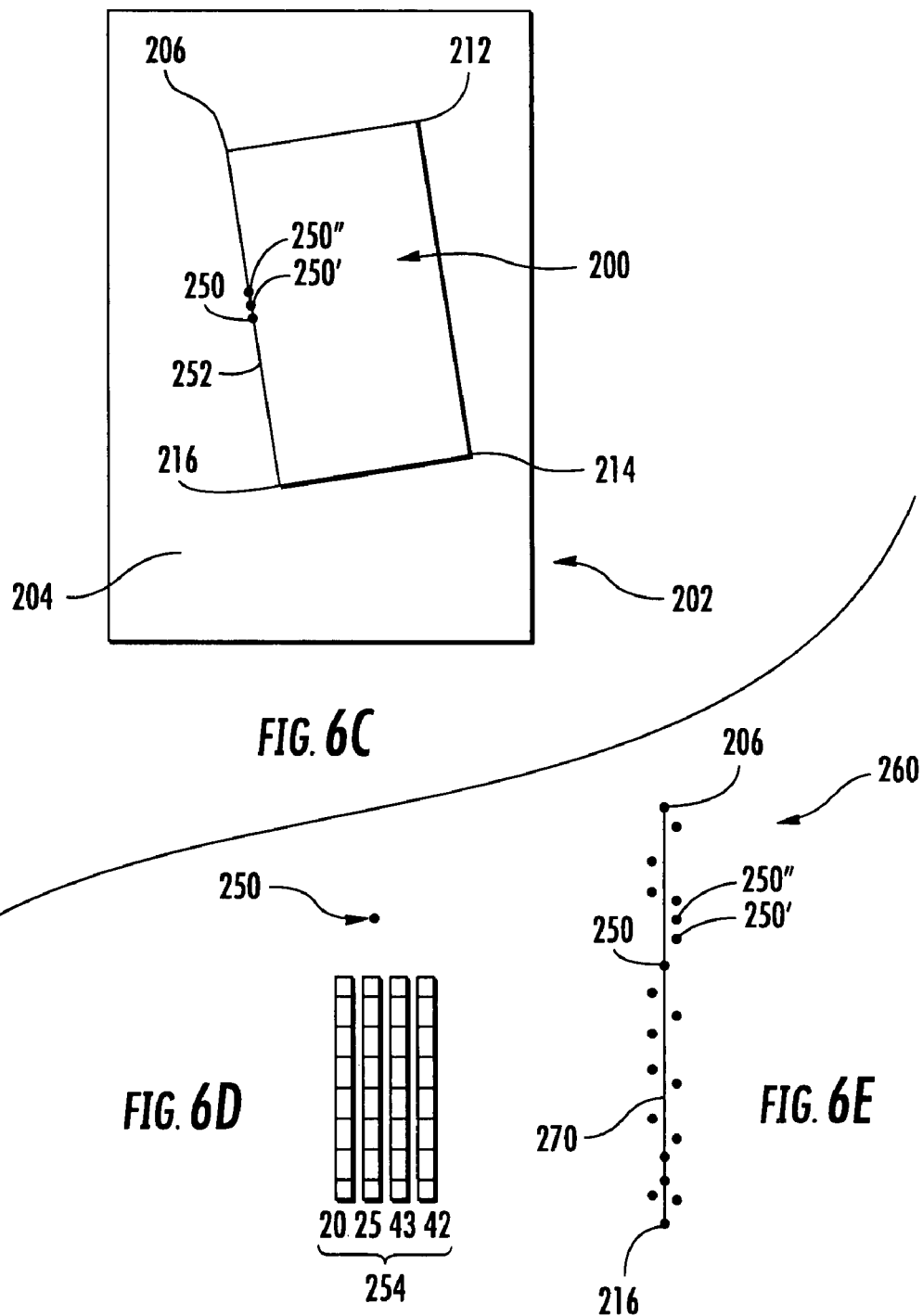

PARCEL DIMENSIONING MEASUREMENT SYSTEM AND METHOD

FIELD OF THE INVENTION

This subject invention relates primarily to parcel shipping and sorting systems.

BACKGROUND OF THE INVENTION

In a modern parcel shipping installation, parcels proceed on a conveyor belt and an overhead dimensioning system determines the height, width and length of the individual parcels. Various dimensioning systems are based on different technologies. There are laser ranging systems, scanning systems, triangulated CCD camera/laser diode systems such as the DM-3000 Dimensioner (Accu-Sort), and LED emitter-receiver systems.

Downstream of the dimensioning system is typically a bar code decoder system. Again, various technologies are available including laser scanners and imagers and line scan cameras such as the SICK MVS series of cameras. Sometimes, the dimensioning system provides an output to the bar code decoder system to focus it on the parcel.

In order for the dimensioning system to be "legal for trade," certain requirements must be met. Known dimensioning systems, hereinafter "general dimension" systems or subsystems, are primarily limited by their accuracy which is referred to as 'd'. Regulations dictate that an object less than 12 d in any dimension cannot be considered legal for trade. See the National Conference on Weighing and Measures, handbook 44 and NTEP Publication 14. Other countries have similar requirements. Current state of the art general dimension systems offer 0.2 inches×d. This means that any object less than 2.4 inches in any dimension is not legal for trade. Thus, many current or general dimensioning systems are not sufficiently accurate to measure a parcel with one very small dimension, in one example, a box 14 inches long by 16 inches wide but only 2 inches high (e.g., a picture frame).

SUMMARY OF THE INVENTION

It is therefore an object of this invention to provide a more accurate parcel dimensioning system and method.

It is a further object of this invention is to provide such a system and method which reduces the cost and complexity of determining the dimensions of a parcel.

It is a further object of this invention to provide a system and method that meets the requirement of legal for trade for dimensions.

It is a further object of this invention to provide such a system and method which can be implemented primarily in software.

The subject invention results from the realization that more accurate dimensions of a parcel may be determined by utilizing the general dimensions, as determined by a typical or general dimensioning system for example, in combination with a two-dimensional image obtained using one-dimensional scanning.

The subject invention, however, in other embodiments, need not achieve all these objectives and the claims hereof should not be limited to structures or methods capable of achieving these objectives.

This invention features a parcel dimension measurement system including image sensors oriented to image a parcel, an imaging subsystem configured to stitch together outputs of the image sensors to produce at least one two-dimensional image comprised of a plurality of pixels, and a general dimension subsystem including general parcel dimension information. A fine dimensioning subsystem is configured to determine dimension measurements of the parcel using the at least one two-dimensional image and the general parcel dimension information. In one embodiment the fine dimensioning subsystem is configured to locate points on the parcel in the two-dimensional image using the general parcel dimension information, calculate pixels from one point to another point, and convert the number of pixels to a dimension measurement. The point may be located on an edge of the two-dimensional image of the parcel, and/or at least one of the points may be a corner of the two-dimensional image of the parcel. In one configuration the image sensors are line scan cameras. The dimension measurements will be legal for trade dimensions. In one embodiment, the fine dimensioning subsystem is configured to locate a point on the parcel in the two-dimensional image by determining pixel coordinates of a point on the parcel in the two-dimensional image, conducting line scans proximate the point, calculating an average numerical value of the pixels in each line scan, detecting a significant change in the average numerical value of the pixels of the line scans proximate the pixel coordinates of the point, and setting the pixel coordinates of the point to pixel coordinate values where the significant change in the average numerical value of the pixels of the line scans was detected.

In one example, the fine dimensioning subsystem is configured to convert the number of pixels to a dimension measurement by determining dots per inch from the image sensors and multiplying the number of pixels calculated by the dots per inch. In one variation, the fine dimensioning subsystem is configured to calculate the number of pixels from one point to another point by determining the difference between the pixel coordinate values of the two points. In one embodiment, the fine dimensioning subsystem is configured to create a mapping of the points in the two-dimensional image, and may be configured to formulate, from the mapping, a line representing an edge of the parcel in the two-dimensional image. The fine dimensioning subsystem may be further configured to conduct multi-level detection and to set the pixel coordinates of the point using sub-sampling of the at least one two-dimensional image. The fine dimensioning subsystem may also be configured to set the pixel coordinates of four corners of the parcel in the at least one two-dimensional image, and it may be further configured to set the pixel coordinates of four corners of each face of the parcel. The imaging system may be configured to store in memory the at least one two-dimensional image of the parcel. In one configuration, the parcel dimension measurement system includes a bar code decoder subsystem configured to decode any bar codes on the parcel, and the bar code data and parcel dimension measurements are integrated and displayed.

This invention also features a parcel dimension measurement system including image sensors oriented to image a parcel, an imaging subsystem configured to stitch together outputs of the image sensors to produce at least one two-dimensional image comprised of a plurality of pixels, and a general dimension subsystem including general parcel dimension information. A fine dimensioning subsystem is configured to locate points on the parcel in the two-dimensional image using the general parcel dimension information by determining pixel coordinates of a point on the parcel in the least one two-dimensional image, conducting line scans proximate the point, calculating an average numerical value of the pixels in each line scan, detecting a significant change in the average numerical value of the pixels of the line scans proximate the pixel coordinates of the point, and setting the pixel coordinates of the point to pixel coordinate values where the significant change in the average numerical value of the pixels of the line scans was detected. The fine dimensioning subsystem is further configured to calculate the number of pixels from one point to another point and convert the number of pixels to a dimension measurement.

This invention further features a parcel dimension measurement system including image sensors oriented to image a parcel, an imaging subsystem configured to stitch together outputs of the image sensors to produce at least one two-dimensional image comprised of a plurality of pixels, and a general dimension subsystem including general parcel dimension information. A fine dimensioning subsystem is configured to locate points on the parcel in the two-dimensional image using the general parcel dimension information, calculate the number of pixels from one point to another point, and convert the number of pixels to a dimension measurement by determining dots per inch from the image sensors and multiplying the number of pixels calculated by the dots per inch.

This invention also features a parcel dimension measurement method including imaging a parcel using image sensors, stitching together outputs of the image sensors to produce at least one two-dimensional image comprised of a plurality of pixels, determining general parcel dimension information, and determining dimension measurements of the parcel using the at least one two-dimensional image and the general parcel dimension information. In one embodiment the method includes locating points on the parcel in the two-dimensional image using the general parcel dimension information, calculating the number of pixels from one point to another point, and converting the number of pixels to a dimension measurement. In one example the image sensors are line scan cameras and the dimension measurements are legal for trade dimensions. In one configuration, the method further includes determining pixel coordinates of a point on the parcel in the least one two-dimensional image, conducting line scans proximate the point, calculating an average numerical value of the pixels in each line scan, detecting a significant change in the average numerical value of the pixels of the line scans proximate the pixel coordinates of the point, and setting the pixel coordinates of the point to pixel coordinate values where the significant change in the average numerical value of the pixels of the line scans was detected. In one example, converting the number of pixels to a dimension measurement includes determining dots per inch from the image sensors and multiplying the number of pixels calculated by the dots per inch. In one variation, calculating the number of pixels from one point to another point includes determining the difference between the pixel coordinate values of the two points.

In one embodiment the method includes creating a mapping of points, and may further include formulating from the mapping a line which represents an edge of the two-dimensional image of the parcel. The method may also include conducting multi-level detection and setting of the pixel coordinates of the point using sub-sampling of the two-dimensional images, and setting the pixel coordinates of four corners of the parcel in the at least one two-dimensional image, as well as setting the pixel coordinates of four corners of each face of the parcel. In one example, the method includes storing in memory the at least one two-dimensional image of the parcel, as well as decoding any bar codes on the parcel, and/or integrating and displaying bar code data and parcel dimension measurements.

This invention further features a parcel dimension measurement method including imaging a parcel using image sensors, stitching together outputs of the image sensors to produce at least one two-dimensional image comprised of a plurality of pixels, determining general parcel dimension information, and locating points on the parcel in the two-dimensional image using the general parcel dimension information. Locating the points on the parcel is achieved by determining pixel coordinates of a point on the parcel in the least one two-dimensional image, conducting line scans proximate the point, calculating an average numerical value of the pixels in each line scan, detecting a significant change in the average numerical value of the pixels of the line scans proximate the pixel coordinates of the point, and setting the pixel coordinates of the point to pixel coordinate values where the significant change in the average numerical value of the pixels of the line scans was detected. The method further includes calculating the number of pixels from one point to another point and converting the number of pixels to dimension measurement.

This invention also features a parcel dimension measurement method including imaging a parcel using image sensors, stitching together outputs of the image sensors to produce at least one two-dimensional image comprised of a plurality of pixels, determining general parcel dimension information, locating points on the parcel in the two-dimensional image using the general parcel dimension information, calculating the number of pixels from one point to another point, and converting the number of pixels to a dimension measurement by determining dots per inch from the image sensors and multiplying the number of pixels calculated by the dots per inch.

BRIEF DESCRIPTION OF THE SEVERAL VIEWS OF THE DRAWINGS

Other objects, features and advantages will occur to those skilled in the art from the following description of a preferred embodiment and the accompanying drawings, in which:

FIGS. 6C-6E are highly schematic depictions of one example of parcel point and/or edge determination in accordance with the present invention;

DETAILED DESCRIPTION OF THE INVENTION

Figure 1:
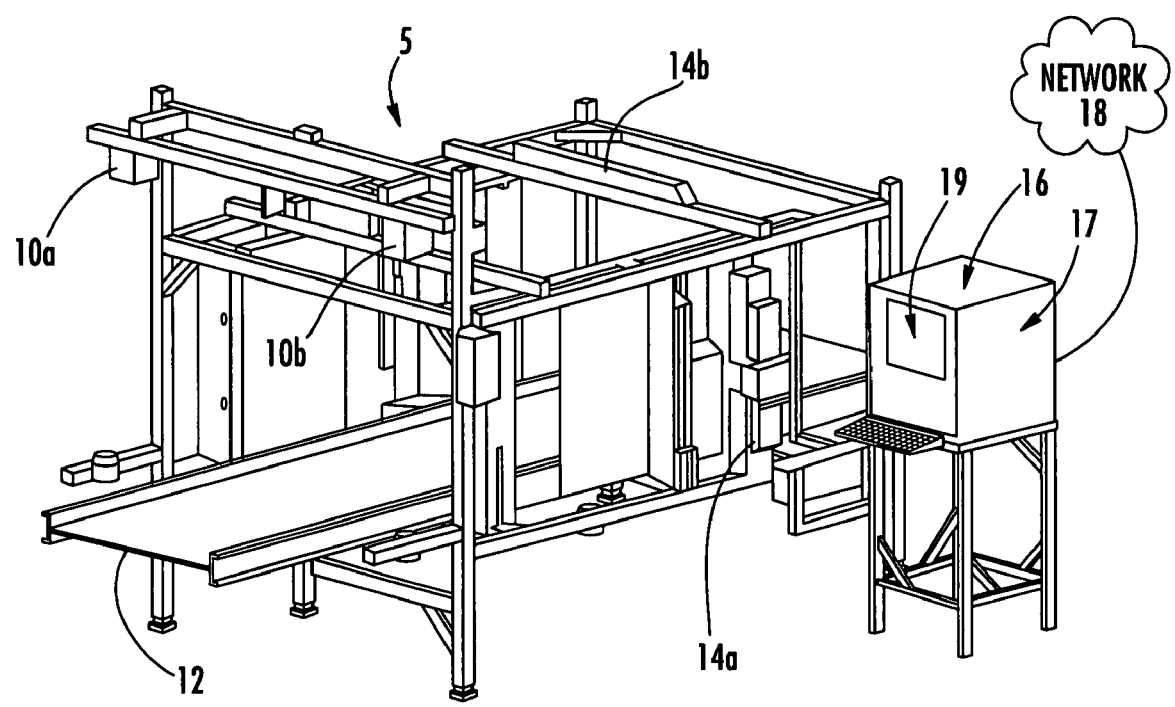
FIG. 1 is a schematic three-dimensional perspective view showing a typical parcel shipping and sorting installation.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 depicts a parcel shipping/sorting system tunnel typically used at a carrier installation such as a UPS or FedEx installation. Camera tunnel 5 includes a parcel dimensioning system with one or more units 10a, 10b, and the like configured to measure the dimensions and position of a parcel traveling on parcel transport conveyor 12. Tilt trays and other transport means are known in the art. A bar code decoding system would typically include one or more additional downstream units, 14a, 14b, and the like, in order to decode any bar code present on the parcel. Again, various technologies are currently in use including those discussed in the Background section above. Typically, units 14a, 14b, and the like are image sensors, and in one configuration are auto focus line scan cameras. These cameras may be placed about the camera tunnel to image the top, the sides, and/or the bottom of the parcels, i.e. each face of the parcel. Sometimes, the output of the dimensioning system is also provided as an input to the bar code decoder camera unit(s) to focus the same.

Computer rack 16 is linked to both the dimensioning and barcode decoder systems to process the outputs of each system and keep a record of the data collected concerning each parcel on conveyor 12. Computer 17 with monitor 19 may be a node in network 18 so numerous shipping/sorting systems can be linked together to share records.

Other components which may be included as part of an improved shipping/sorting system include components as more fully described in the co-pending U.S. patent application filed on even date herewith entitled Parcel Imaging System and Method, by common inventors as those hereof and of the same assignee, which is hereby incorporated herein by reference. For example, bar code decoder software subsystem 45, FIG. 2 decodes any barcodes present on the parcel from the image or images in memory. See U.S. Pat. No. 6,845,914 and co-pending application Ser. No. 10/382,405 (U.S. Pat. App. Publ. No. 2004/0175052) both incorporated herein by this reference. Imaging subsystem 44 may provide output to image construction subsystem 46 which is configured or programmed to produce a viewable three-dimensional image of each parcel passing through the tunnel of a shipping/sorting installation. The outputs of general dimension subsystem 40 and bar code decoder subsystem 45 may also be routed to image construction subsystem 46, as shown, to associate, with each three-dimensional parcel image, the parcel dimension and bar code(s) information. Image construction subsystem 46 may display and store three-dimensional parcel images, and/or the output of image construction subsystem 46, including but not limited to three-dimensional parcel images, may be stored as shown at 48 and displayed. Storage 48 may include files containing e.g. three-dimensional images of each parcel so processed along with bar code and/or dimensional data which may be accessed via a network as shown and as discussed above with reference to FIG. 1. Image construction subsystem 46 also may include software or makes use of various technology to, for example, strip the background image from the parcel so only the parcel itself is displayed, and such a background stripper subsystem or module 60 may be a component of image construction subsystem 46. Sampling/compression module 64 may be used to reduce the file size of a three-dimensional image and/or to retain, as high resolution data, only selected portions of a parcel (e.g., labels and the like). Rotation module or subsystem 66 may allow the user to rotate a displayed three-dimensional parcel image. Brightness adjustment module or subsystem 68 may provide a more realistic looking three-dimensional parcel image especially as it is rotated. File construction module 72 may associate or integrate and store the three-dimensional image of a parcel with, for example, its bar code and/or dimension and/or other data in a single file for later retrieval. Three-dimensional image construction module 74 may construct displayable three-dimensional images from two or more two-dimensional images. Fine dimensioning subsystem 70 allows the user to more accurately determine parcel dimensions, and if desired, to display an image of the parcel such as a three-dimensional image with such dimensions. Preferably, subsystems or modules 60-74 are software modules configured or programmed to perform their various functions.

As explained in the Background section above, in order for any dimensioning system to be legal for trade, certain requirements must be met and many current dimensioning systems are not sufficiently accurate to be legal for trade for certain parcel dimensions. In conventional or general dimension systems, one-dimensional—or line scan—scanning is not used. Instead, two-dimensional sensors such as two-dimensional scanners or cameras are used. Two-dimensional images created thereby are typically on the order of 100×100 pixels, which is relatively low resolution. This limited information is utilized by known or general dimension systems, resulting in parcel dimensions which may be suitable in some instances, but which are insufficient for parcels or packages of small dimensions as noted above. In accordance with the present invention, fine dimensioning subsystem 70 allows the user to more accurately determine or measure the dimensions of a parcel.

Output from a typical general dimension subsystem 40 (including unit 10a, 10b, and the like, FIG. 1) provides general position and rough or general dimension data to image sensors such as line scan cameras 14 which then controls their focusing on the various parcels. In accordance with the subject invention, the outputs of line scan cameras 14a, 14b, and the like are used not just to decode the bar codes present on the parcels and focus the cameras but also to provide a more accurate determination of parcel dimensions. An analog-to-digital converter measures the charge on each pixel of the line scan cameras and converts the charge information to a digital output provided on fiber optic cable 42, FIG. 2 as an input to the imaging subsystem software 44 which then stores the image or images in a memory. A CMOS sensor could also be used. There may be one image sensor and associated optical elements provided and oriented to image all three dimensions of a parcel or multiple image sensors oriented to view different parcel dimensions, e.g., the top, the bottom, and one or more sides. In one embodiment there are at least two line scan cameras oriented to image the parcels.

General dimension subsystem 40 typically includes parcel information 41 for locating the general area of the parcel in the image, such as rough or general parcel length, width and height, as well as its angle on the transport conveyor, its center of gravity, and its four corner coordinates, and general dimension subsystem 40 may include more or less types of information for a particular application. Parcel information 41 may be stored separately in general dimension subsystem 40 for use whenever needed for a particular application, such as for more precise dimensioning in accordance with the subject invention.

Image sensors or line scan cameras, such as autofocus line scan CCD cameras 14 provide camera information 43 to imaging subsystem 44 and/or image construction subsystem 46, and/or directly to fine dimensioning subsystem 70 as discussed more fully below. Camera information 43 includes information concerning the actual physical layout of the camera tunnel through which the parcel passes, and typically includes information such as the number of cameras, which camera is providing the information and from what angle (i.e. top camera at 15°, side camera at 45°) as well as information regarding DPI (dots per inch) and LPI (lines per inch). An operator can set some particular parameters for the camera tunnel configuration, i.e. camera angles, which may be verified by the system with a test box or parcel. A digital zoom module 62 in the imaging subsystem 44 can be used to keep uniform DPI, and LPI for any part in the parcel can be maintained using a belt speed sensor, such as a tachometer in one non-limiting example. To the extent that digital zoom is provided in a camera itself, it can be corrected by digital zoom module 62 as necessary.

Figure 2:
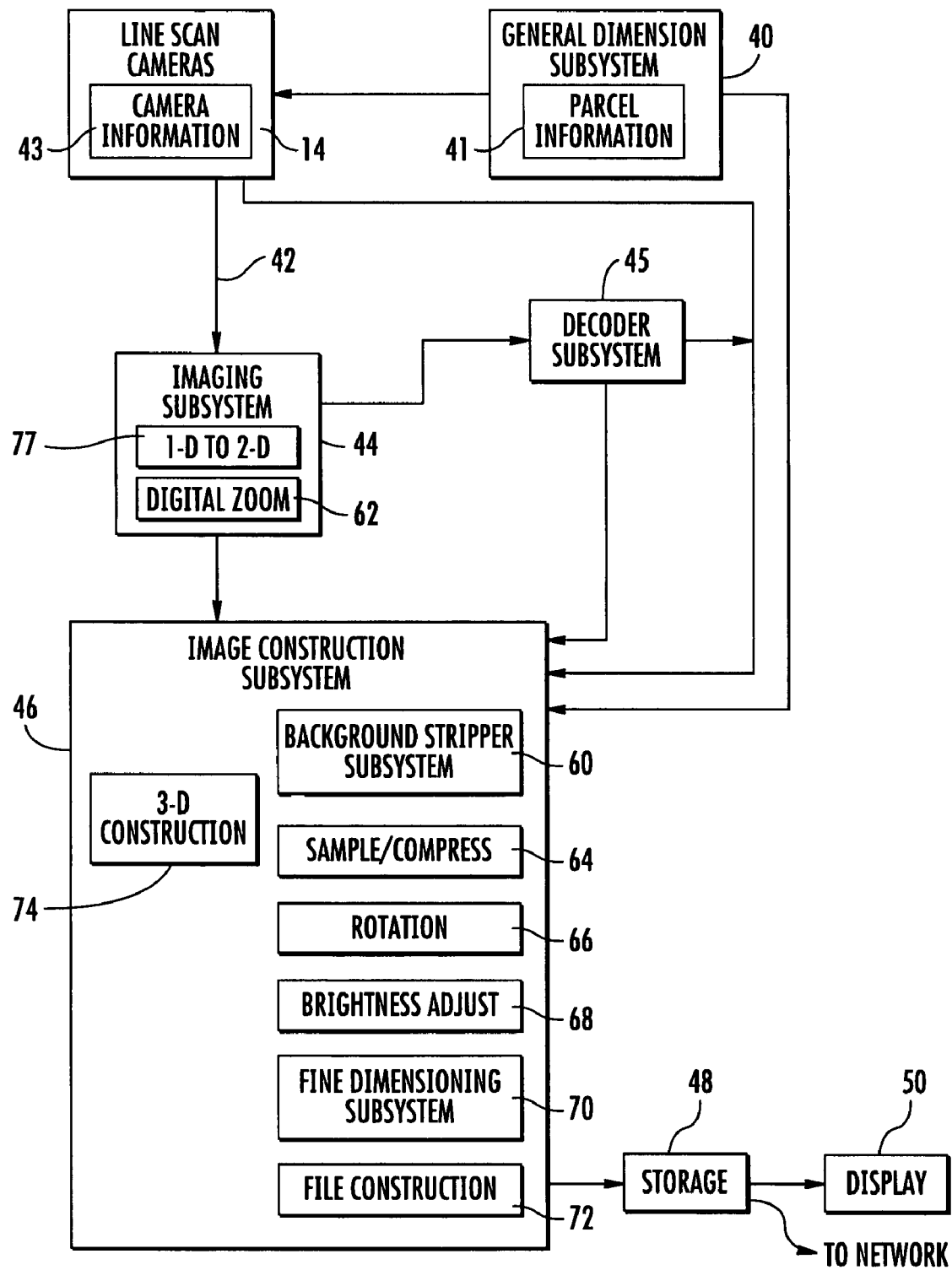
FIG. 2 is a schematic block diagram showing primary components associated with one example of a parcel dimensioning system in accordance with this invention.
Figure 3:
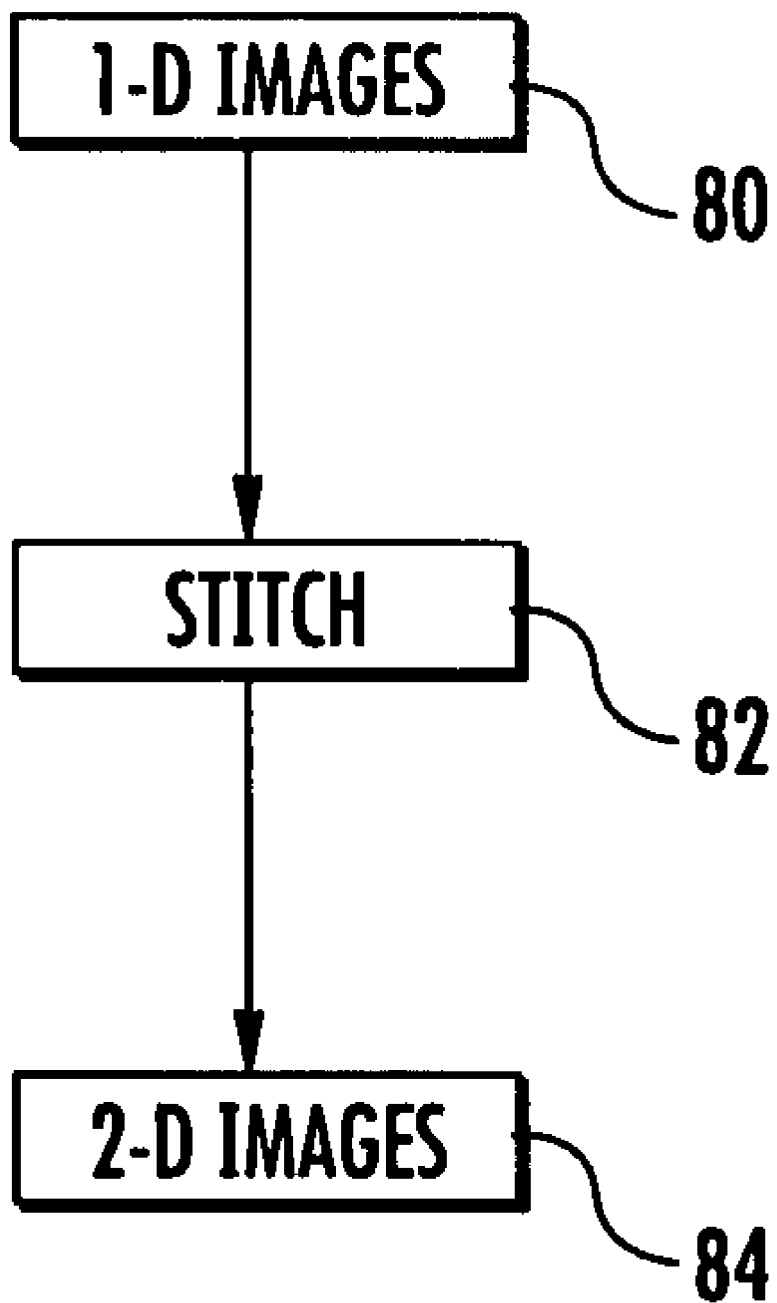
FIG. 3 is a flowchart depicting the primary steps associated with one example of stitching together one-dimensional images in accordance with the present invention.

According to a preferred parcel dimensioning method, using one-dimensional scanning the line scan cameras provide multiple one-dimensional images of a portion of a parcel, step 80, FIG. 3. These one-dimensional images are stitched together, step 82 to produce one or more two-dimensional images, step 84. Typically, imaging subsystem 44, FIG. 2 produces these two-dimensional stitched together images, and dimensioning subsystem 70 is part of image construction subsystem 46. These are not necessary limitations, however, and imaging subsystem 44 may be part of image construction subsystem 46, and/or dimensioning subsystem 70 may be separate from image construction subsystem 46. Background imagery may be stripped away as more fully described in the co-pending U.S. patent application filed on even date herewith entitled Parcel Imaging System and Method, by common inventors as those hereof and of the same assignee, which is hereby incorporated herein by reference.

Figure 4:
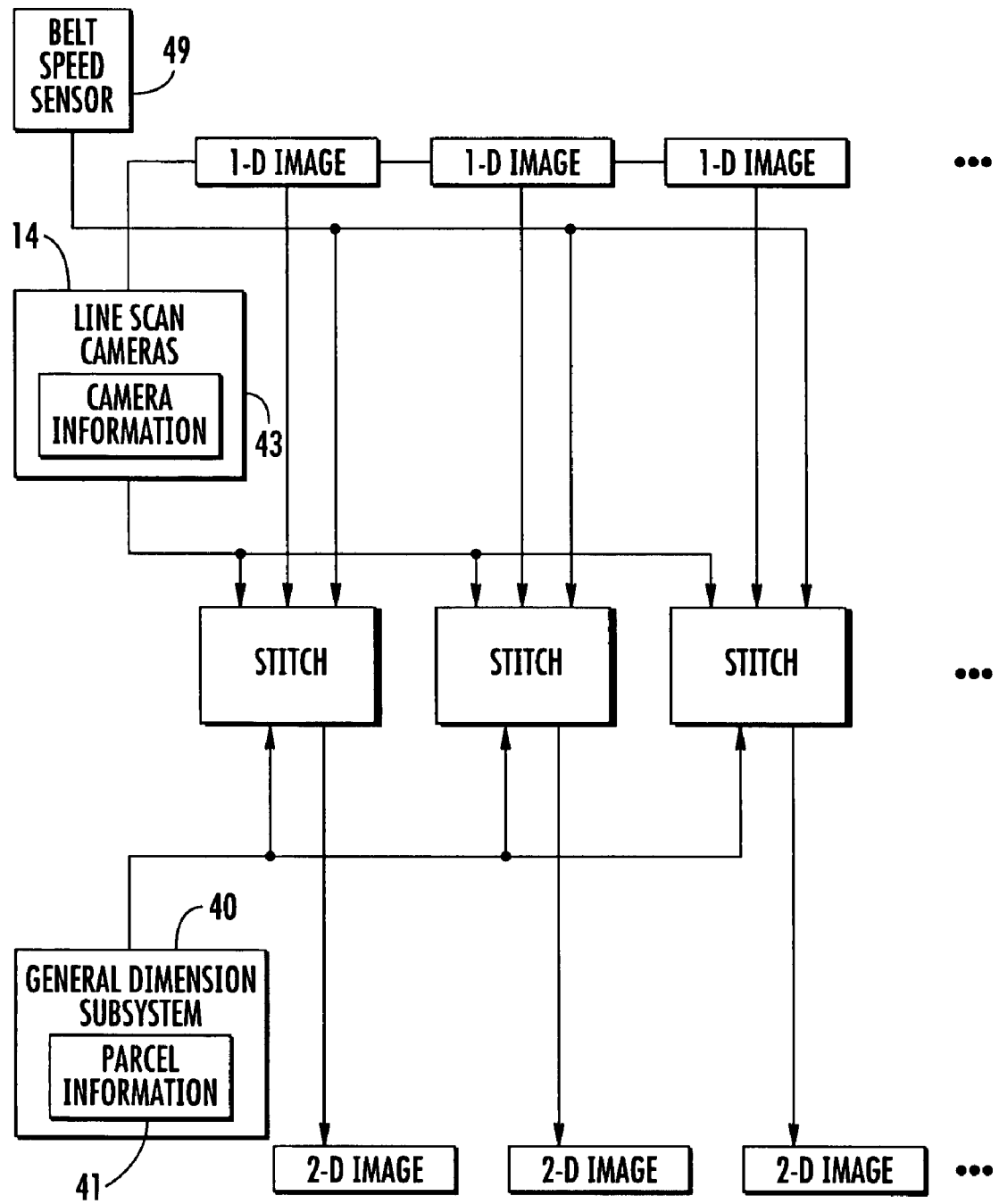
FIG. 4 is a flowchart depicting the primary processing steps of one embodiment of the one-dimensional image stitching module for stitching together one-dimensional images to form two-dimensional images in accordance with the present invention.

As noted above, cameras or units 14*a*, 14*b*, FIG. 1 such as auto focus line scan CCD cameras, provide multiple one-dimensional images of a portion of a parcel, which may be and are typically stored in imaging subsystem 44, FIG. 2. In just one example, each one-dimensional image is an 8000 pixel×1 pixel array. Scanning at 20,000 HZ for example, an array of 20,000×8000 pixels may be formed, although the invention is not limited to such array dimensions. It can be seen, however, that resolution in accordance with the systems and methods of the present invention are orders of magnitude greater than systems or sensors creating 100×100 pixel arrays. Stitching together one-dimensional images to form two-dimensional images is accomplished by one-dimensional image stitching subsystem or module 77 of imaging subsystem 44. Known methods may be used, e.g. software supplied by Omniplanner, or other commercially available software or systems. Preferably, however, constructing two-dimensional images or stitching one-dimensional images together to form two-dimensional images is achieved in accordance with one embodiment of the subject invention as shown in FIG. 4, using camera information 43 and information from general dimension subsystem 40. As discussed above, the output of general dimension system 40 can be provided as input to a bar code decoder camera to focus the camera. In stitching together the one-dimensional images to form two-dimensional images, the cameras are also focused, with adjustments made for package position and movement. This focusing is provided for using information from general dimension subsystem 40. Belt speed sensor 49 senses conveyor belt speed in the camera tunnel such that the number of one-dimensional scans per second, the scanning rate, may be increased or decreased as necessary to accommodate for changes in conveyer belt speed and maintain constant LPI. Proper camera angle settings for scanning the one-dimensional images are provided by camera information 43 from line scan cameras 14. Two-dimensional images are formed by stacking or stitching multiple one-dimensional images using information and data from general dimension subsystem 40, belt speed sensor 49, and camera information 43.

Figure 5:
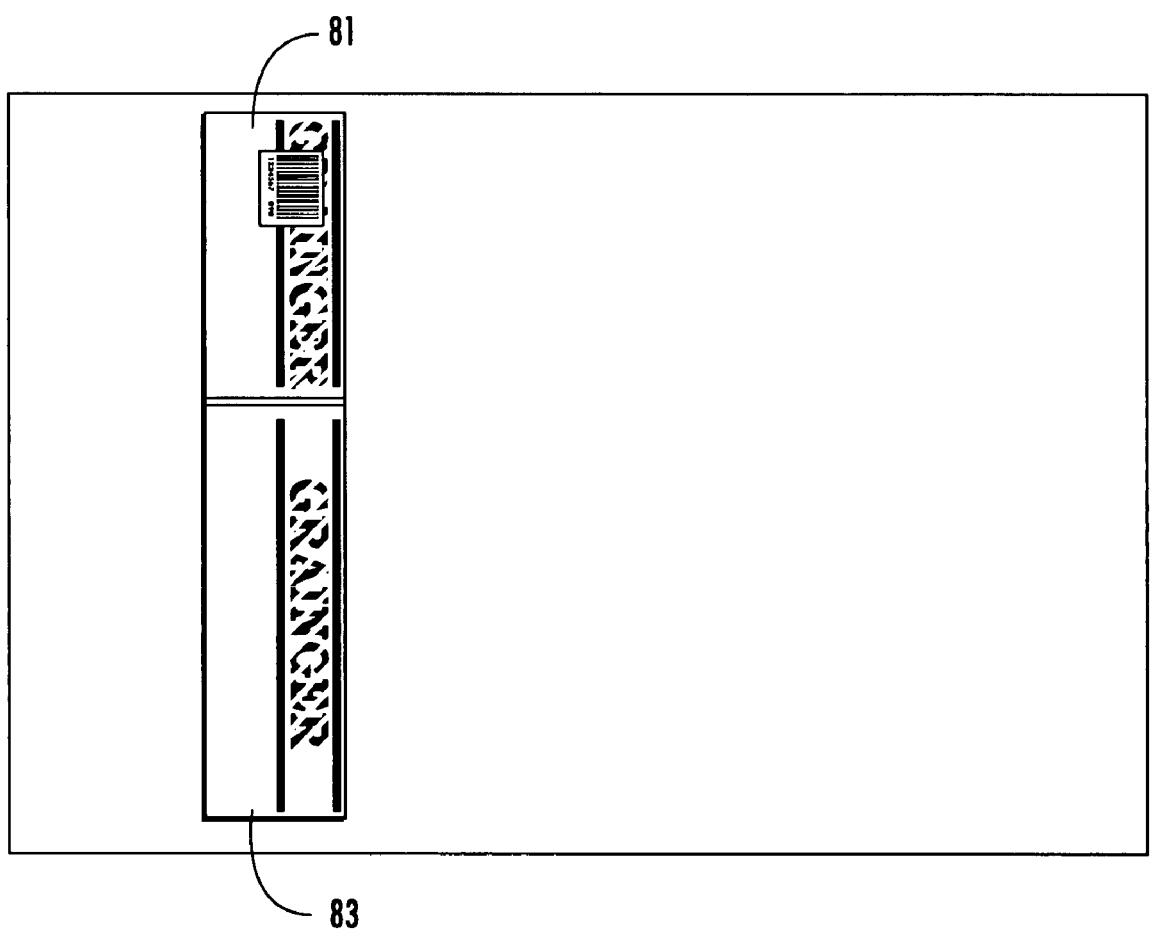
FIG. 5 is a depiction of an example of a two-dimensional image of the front and side of a parcel as formed in accordance with the present invention.

Thus, one or more two-dimensional images which can show the front 81, FIG. 5 or side 83 of a parcel for example are produced from one-dimensional images.

With the two-dimensional image of the package or parcel and the general parcel dimensions which are known from general dimension subsystem 40, FIG. 2, fine dimensioning subsystem 70 can determine the parcel dimensions more precisely.

Figure 6A:
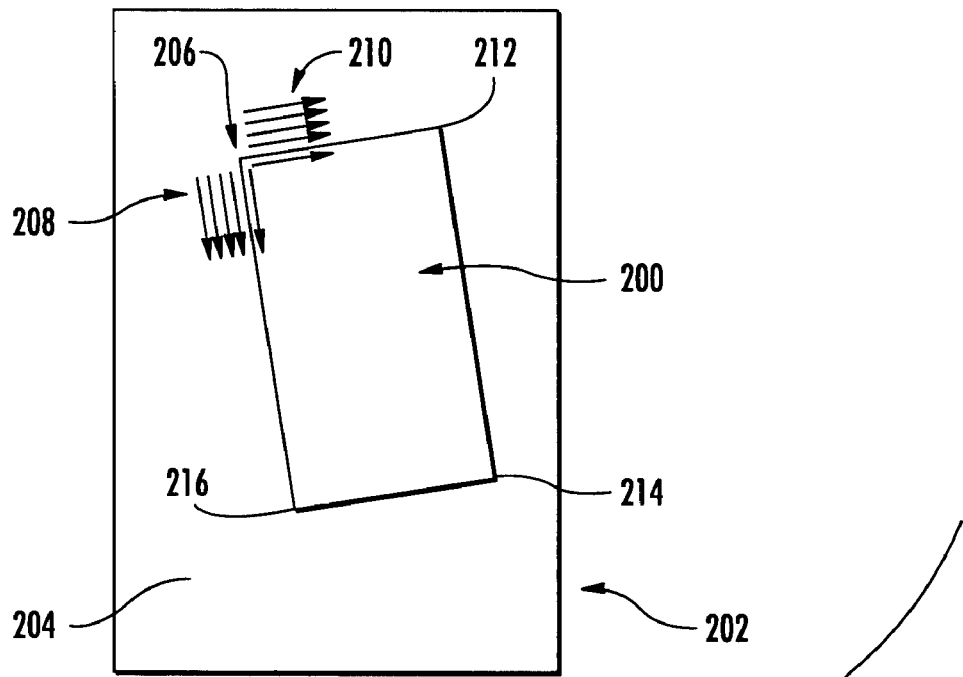
FIGS. 6A and 6B are highly schematic depictions of one example of parcel corner determination in accordance with the present invention.

Using the general parcel dimensions obtained from general dimension subsystem 40, i.e. length, width, height, as well as center of gravity and angle on the conveyor belt, and camera information 43 from line scan cameras 14, FIG. 4, i.e. camera angles, DPI and LPI, the pixel coordinates of points, such as corners of the parcel or points on an edge of the parcel image, are determined. Thus, the shape and position of the top of the parcel 200, for example, FIG. 6A is roughly located within the entire image 202. Next, contrast is used to more precisely locate the parcel 200 in background 204. It is known in the art that, for example, if a pixel has a numerical value of 255, that pixel is white. If a pixel has a numerical value of 0, it is black. Pixels having values between 0 and 255 represent variations between white and black, i.e. gray scale. When image quality is less than ideal, pixels near corner 206 of parcel 200, for example, have gray scale values which make the corner indistinguishable to the naked eye.

Figure 6B:
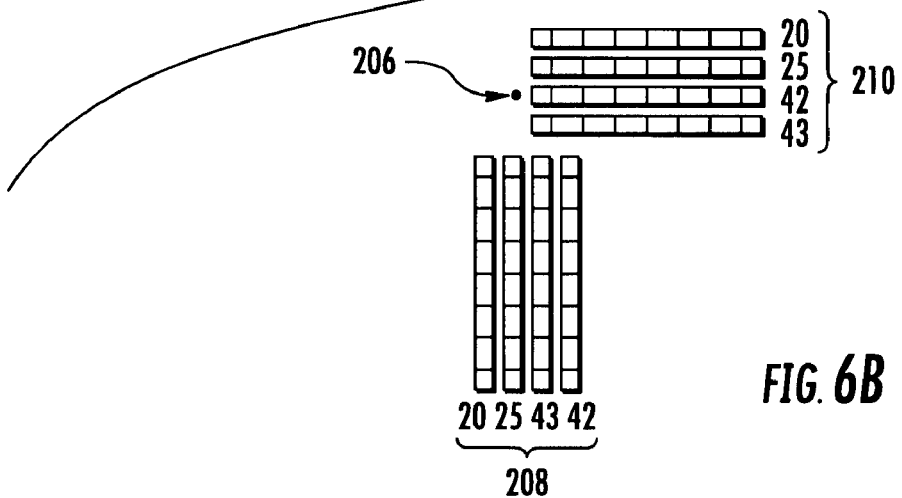

In one variation, corner 206 can be more precisely determined, however, by conducting line scans 208, 210 proximate corner 206 as located using the general parcel dimensions. In one example, scans 208 and 210 are conducted along edges of the parcel image proximate corner 206, as located by the general parcel dimensions and/or the image. The average numerical value of the pixels in each line scan is calculated, and the average value of the pixels in each line scan will change more sharply or significantly near parcel corner 206 at or near the intersection of two line scans as shown in FIG. 6B. When such a change in average value is detected, corner 206 can be set to the pixel coordinate values, e.g. x and y coordinates as discussed further below, where the significant change is detected, thus more precisely locating the corner. The location of each corner 206, 212, 214, and 216 of each two-dimensional image of parcel 200 may be determined in this same way as necessary, and this operation may be performed on each two-dimensional image of each face of the parcel, namely not only the top, but also the bottom, front, back, right and left sides of the parcel.

In another variation, one or more points along the vicinity of an edge of the parcel, other than corners or in addition to corner points, may also be more precisely located and utilized to more accurately determine parcel dimensions. Point 250, FIG. 6C as well as other points in the vicinity of edge 252 of parcel 200 may be more precisely determined by conducting line scans 254, FIG. 6D proximate points 250, as well as proximate points 250', 250" and so on all along the vicinity of edge 252 as located using the general parcel dimensions. By conducting line scans at a plurality of such points a mapping 260, FIG. 6E of points—which may be indicative of an edge and/or the length, width or height of the parcel—is created based on detection of a change in the average pixel value for each line scan. Edge point 250 as well as other edge points 250', 250" can be set to the pixel coordinate values where the significant average value change is detected in order to create mapping 260 which includes a plurality of such points. An edge of the parcel can thus be more precisely located by formulating a line 270 more precisely representing a parcel edge using these pixel coordinate values for the mapping than by using only the raw or general dimension values for edge 252. As noted, this is especially valuable when image quality is less than ideal and/or when there is little to no contrast between the parcel and the background. A similar operation may be performed for each edge of the parcel and for each parcel face, and the distance between these precisely determined edges will result in more accurate parcel dimensioning as discussed further below.

Because it can be desirable to conduct a multi-level search for the corners and/or other points for even more accuracy, in one embodiment, a sub-sample of the entire image is created first, where every $64^{th}$ pixel is used to create a 64×64 pixel thumbnail image. One or both of the foregoing processes is then conducted to determine the corners or points of the parcel as necessary for low contrast areas by locating point(s), e.g. on an edge and/or corners of one of the six faces of the parcel (i.e. top, bottom, right, left, front or back) within this 64×64 area. Once the point or corner is located as a point within this 64×64 area, one or both of the process(es) is then repeated for a 16×16 area then a 1×1 area, where the latter is the true point or corner. Each of the four corners, or a plurality of points as the case may be, of a two-dimensional image of the parcel can be thus determined, and x and y coordinates for each of the points and/or corners can be established.

Figure 7:
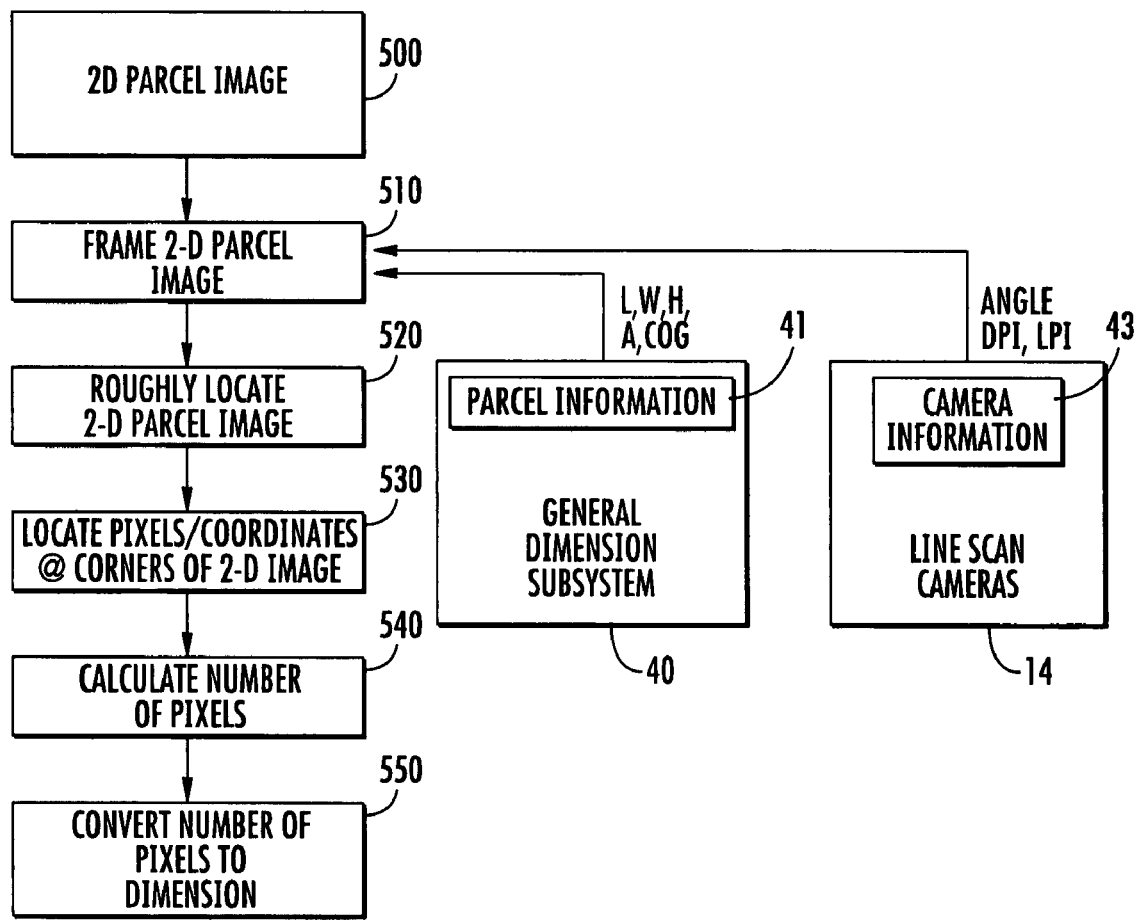
FIG. 7 is a flowchart depicting the primary processing steps of one embodiment of the dimensioning subsystem or module for determining dimensions in accordance with the present invention.
Figure 8:
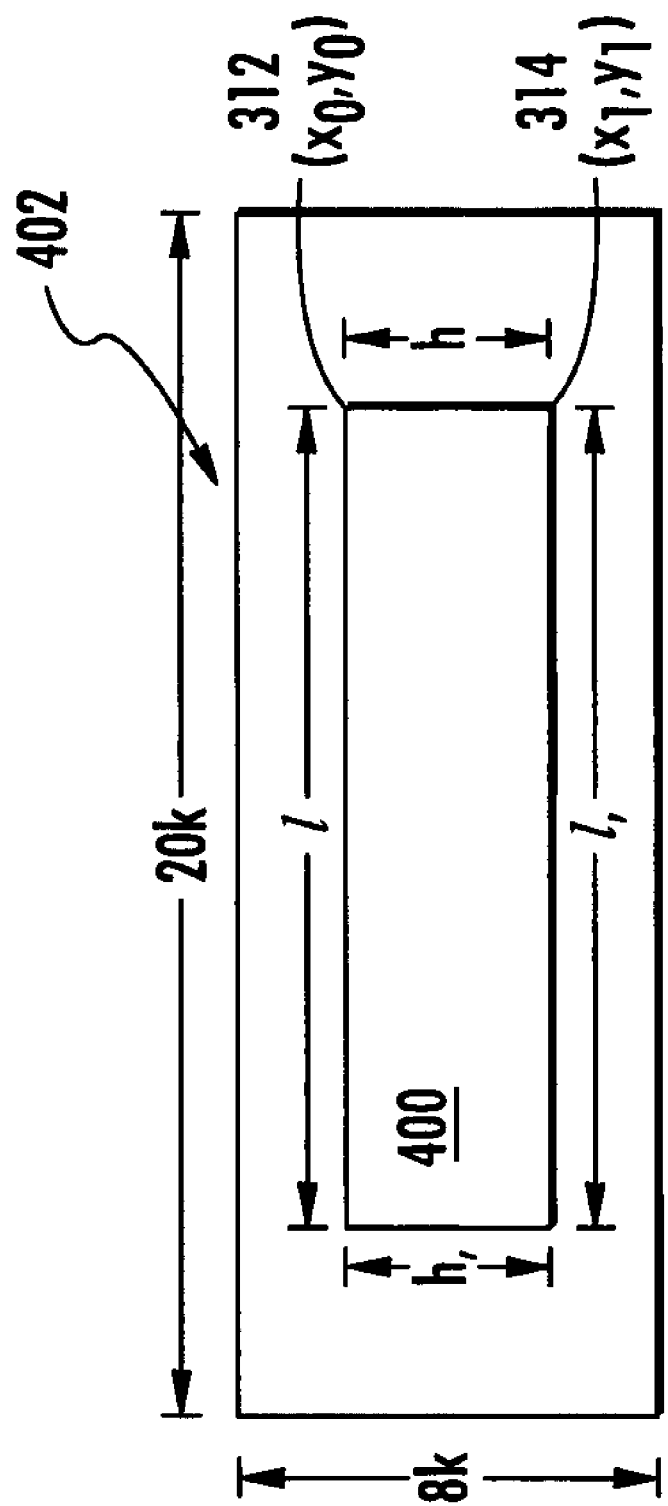
FIG. 8 is a highly schematic depiction of one example of a two-dimensional image showing parcel corners as located in accordance with the present invention.

A summary of one example of the operation of fine dimensioning subsystem 70, FIG. 2 is shown in flowchart form in FIG. 7. From the various line scan cameras in the camera tunnel, a two-dimensional parcel image and background imagery 402, FIG. 8 is captured, step 500, FIG. 7 through one-dimensional scanning described above. Utilizing parcel information 41 and camera information 43, a frame of one two-dimensional face of the parcel (i.e. top, bottom, right, left, front or back face) 400, FIG. 8 within the background imagery is obtained, step 510, FIG. 7. Parcel dimensions from general dimension subsystem 40 are used to roughly locate this two-dimensional face of the parcel, step 520.

In one variation, the corners of the two-dimensional parcel image are then more accurately located, preferably using the corner location method described above, step 530. Once corners 312 and 314, FIG. 8 are located, the pixels representing corner 312 are assigned x and y coordinates e.g. ($x_0,y_0$) and corner 314 is also assigned x and y coordinates e.g. ($x_1,y_1$) coordinates. The number of pixels from corner 312 to corner 314 is calculated, step 540, FIG. 7, by counting the number of pixels or by determining the difference between pixels coordinates from corner 312 to 314. This calculated number is converted to a dimension measurement, step 550, which may be in inches, for example, using DPI from camera information 43, FIG. 7. As shown in FIG. 8, the number of pixels from corner 312 to corner 314 is represented by the dimension h. If dimension h were at an angle within image 402 (not shown), dimension h may be calculated by equation (1):

$$h=\sqrt{(x_1-x_0)^2+(y_1-y_0)^2} \qquad (1)$$

A dimension measurement for all four dimensions h, $h_1$, l, $l_1$, of the parcel face 400, and for all faces of the parcel (front, back, top, bottom, and two sides) can also be determined in the same manner in accordance with the present invention.

Figure 9:
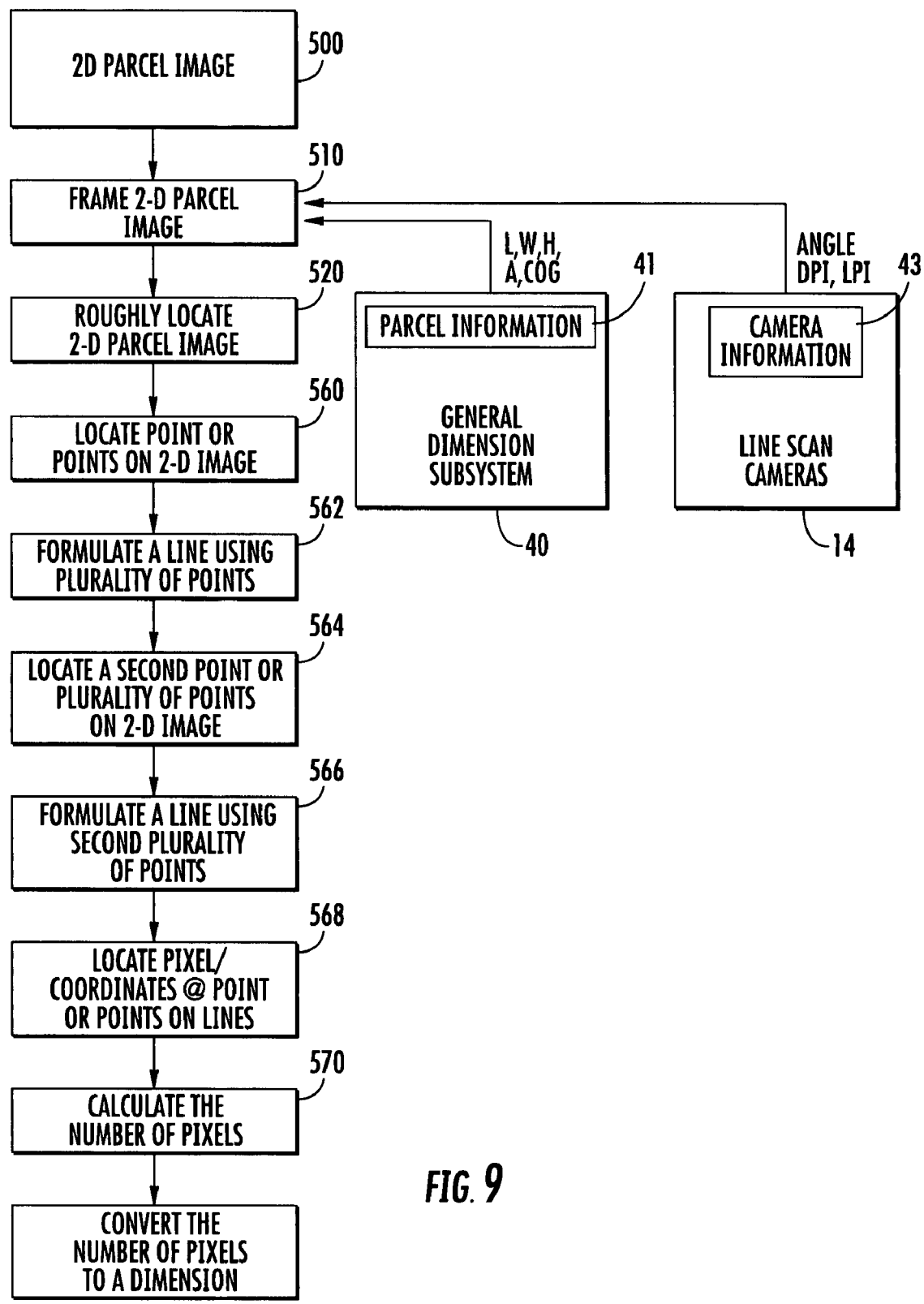
FIG. 9 is a flowchart depicting the primary processing steps of another embodiment of a dimensioning subsystem or module for determining dimensions in accordance with the present invention.
Figure 10:
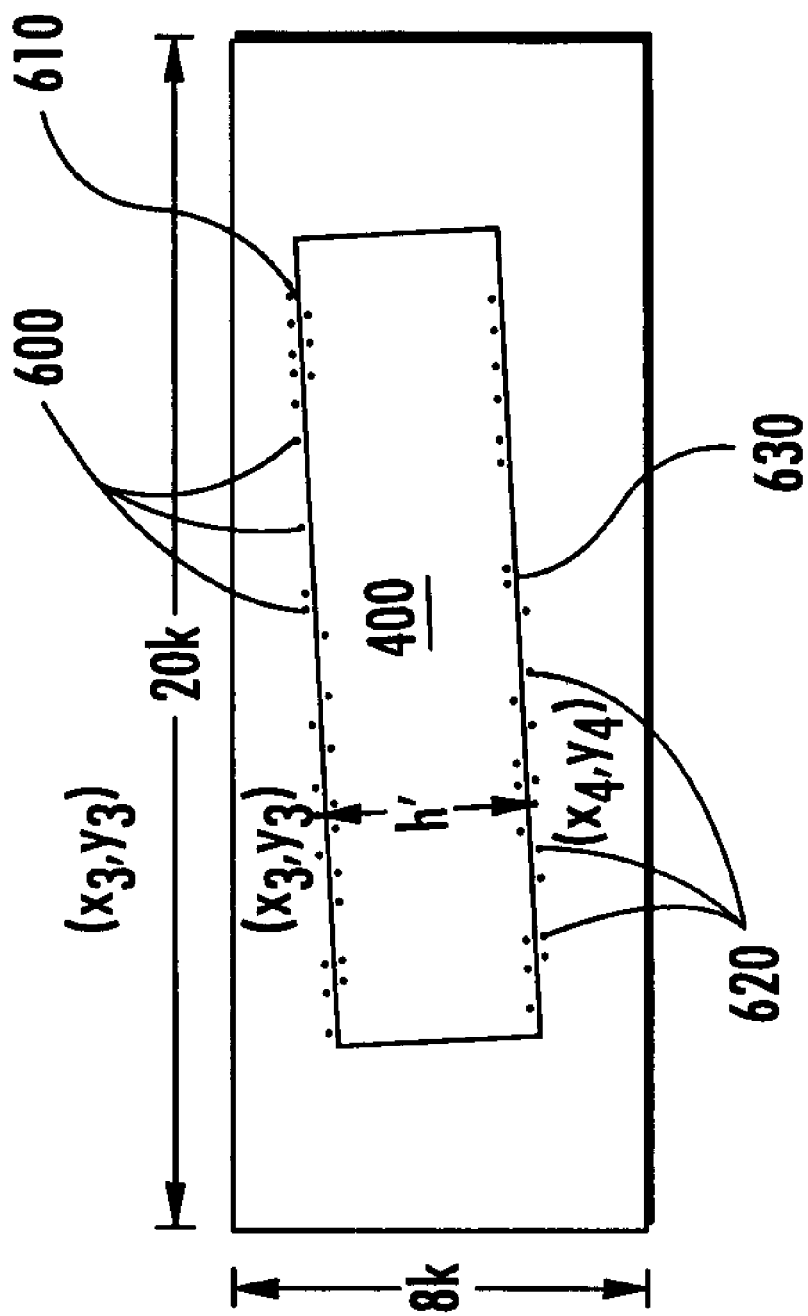
FIG. 10 is a highly schematic depiction of one example of a two-dimensional image showing parcel points and/or edges as located in accordance with the present invention.

In another variation, instead of or in addition to more accurately locating the corners of a two-dimensional parcel image, a point or plurality of points on the two-dimensional parcel image are more accurately located preferably using the point location method described above, step 560, FIG. 9. Once points 600, FIG. 10 are located to creating a mapping of such points, line 610 representing, for example, one parcel edge may be formulated using the mapping of points 600, step 562. A point or plurality of points 620 opposite points 600, typically representing another edge of the parcel, is located preferably using the point location method described above, step 564, to creating a mapping of those points, and line 630 representing another parcel edge may be formulated, step 566. In accordance with this aspect of the invention, the distance between lines 610 and 630 which may in one example be parcel height h', may be determined by locating any point 600 by assigning it x and y coordinates, e.g. ($x_3,y_3$), and also locating any point 620 by assigning it x and y coordinates, e.g. ($x_4,y_4$), step 568. The number of pixels from point, e.g. ($x_3,y_3$) to point, e.g. ($x_4,y_4$) is calculated, step 570, by counting the number of pixels between the points or finding the difference, and converting the number of pixels to a dimension measurement, step 572, typically as described above with respect to corner location. Thus the dimension h' may be measured in this way. Dimension measurements for all dimensions of the parcel face 400 and for all faces of the parcel can also be determined in the same manner. Additionally, it can be seen that a measurement between any two points, typically located on an edge of a parcel, may be obtained, which may be used to identify and measure the dimensions of parcels having uneven sides or odd shapes.

Thus, in accordance with the systems and methods of the present invention, the parcel dimensions are determined to an accuracy of many orders of magnitude greater than conventional methods, and are precise enough to establish legal for trade dimensions.

Accordingly, the output from fine dimensioning subsystem 70, FIG. 2 is the legal for trade parcel dimension data with increased accuracy, e.g., legal for trade for dimensions even one inch or less. Also as noted above, the output from decoder subsystem 45 includes the bar code data. In accordance with a further embodiment of the subject invention, bar code decoding or reading by decoder subsystem 45, and more precise dimension measurements by fine dimensioning subsystem 70, are integrated and the bar code data and dimension measurement data can be displayed to the user together, offering further convenience to the system user.

Various parts or portions of the systems, subsystems, modules and methods of the subject invention may be embedded in software as may be known to those skilled in the art, and/or may be part of a computer or other processor which may be separate from the remaining systems. For example, computer rack 16, FIG. 1 can include all the software, subsystems, modules, methods and the like as described herein including the processor and memory requirements for a complete system. These examples are not meant to be limiting, and various parts or portions of the present invention may be implemented in a computer such as a digital computer, and/or incorporated in software module(s) and/or computer programs compatible with and/or embedded in computers or other conventional devices, and the computer's or device's main components may include e.g.: a processor or central processing unit (CPU), at least one input/output (I/O) device (such as a keyboard, a mouse, a compact disk (CD) drive, and the like), a controller, a display device, a storage device capable of reading and/or writing computer readable code, and a memory, all of which are interconnected, e.g., by a communications network or a bus. The systems, subsystems, modules and methods of the present invention can be implemented as a computer and/or software program(s) stored on a computer readable medium in the computer or meter and/or on a computer readable medium such as a tape or compact disk. The systems, subsystems, modules and methods of the present invention can also be implemented in a plurality of computers or devices, with the components residing in close physical proximity or distributed over a large geographic region and connected by a communications network, for example.

Thus, in accordance with the present invention, a more accurate dimensioning system and method is provided which meets legal for trade requirements while reducing cost and complexity.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. A parcel dimension measurement system comprising:
    line scan cameras oriented to image a parcel having six faces or sides as said parcel is transported through a shipping or sorting tunnel system;
    an imaging subsystem configured to stitch together outputs of the line scan cameras to produce a two-dimensional image of at least one face or side of said parcel, said two-dimensional image comprised of a plurality of pixels;
    a general dimension subsystem including general parcel dimension information; and
    a fine dimensioning subsystem configured to include line scanning to determine dimension measurements of said at least one face of the parcel using the two-dimensional image and the general parcel dimension information.

2. The system of claim 1 in which the fine dimensioning subsystem is configured to:
    locate points on the parcel in the two-dimensional image using the general parcel dimension information,
    calculate the number of pixels from one point to another point, and
    convert the number of pixels to a dimension measurement.

3. The system of claim 2 in which the fine dimensioning subsystem is configured to locate a point on the parcel in the at least one two-dimensional image by:
    determining pixel coordinates of a point on the parcel in the least one two-dimensional image;
    conducting line scans proximate said point;
    calculating an average numerical value of the pixels in each line scan;
    detecting a significant change in the average numerical value of the pixels of the line scans proximate the pixel coordinates of said point; and
    setting the pixel coordinates of said point to pixel coordinate values where the significant change in the average numerical value of the pixels of the line scans was detected.

4. The system of claim 2 in which the fine dimensioning subsystem is , configured to convert the number of pixels to a dimension measurement by:
    determining dots per inch from the image sensors; and
    multiplying the number of pixels calculated by the dots per inch.

5. The system of claim 3 in which the fine dimensioning subsystem is configured to calculate the number of pixels from one point to another point by determining the difference between the pixel coordinate values of the two points.

6. The system of claim 2 in which the fine dimensioning subsystem is further configured to create a mapping of said points in the two-dimensional image.

7. The system of claim 6 in which the fine dimensioning subsystem is further configured to formulate from said mapping a line representing an edge of the parcel in the two-dimensional image.

8. The system of claim 3 in which the fine dimensioning subsystem is further configured to conduct multi-level detection and set the pixel coordinates of the point using sub-sampling of the at least one two-dimensional image.

9. The system of claim 3 in which the points are located on an edge of the two-dimensional image of the parcel.

10. The system of claim 3 in which at least one point is a corner of the two-dimensional image of the parcel.

11. The system of claim 10 in which the fine dimensioning subsystem is further configured to set the pixel coordinates of four corners of the parcel in the at least one two-dimensional image.

12. The system of claim 11 in which the fine dimensioning subsystem is further configured to set the pixel coordinates of the four corners of each face of the parcel.

13. The system of claim 1 in which the dimension measurement is a legal for trade dimension.

14. The system of claim 1 in which the imaging subsystem is configured to store in memory the at least one two-dimensional image of the parcel.

15. The system of claim 1 further including a bar code decoder subsystem configured to decode any bar codes on the parcel.

16. The system of claim 15 in which bar code data and parcel dimension measurements are integrated and displayed.

17. A parcel dimension measurement system comprising:
    image sensors oriented to image a parcel;

an imaging subsystem configured to stitch together outputs of the image sensors to produce at least one two-dimensional image comprised of a plurality of pixels;
a general dimension subsystem including general parcel dimension information; and
a fine dimensioning subsystem configured to:
  locate points on the parcel in the two-dimensional image using the general parcel dimension information by:
    determining pixel coordinates of a point on the parcel in the least one two-dimensional image,
    conducting line scans proximate said point,
    calculating an average numerical value of the pixels in each line scan,
    detecting a significant change in the average numerical value of the pixels of the line scans proximate the pixel coordinates of said point,
    setting the pixel coordinates of said point to pixel coordinate values where the significant change in the average numerical value of the pixels of the line scans was detected;
  calculate the number of pixels from one point to another point; and
  convert the number of pixels to a dimension measurement.

18. A parcel dimension measurement system comprising:
image sensors oriented to image a parcel;
an imaging subsystem configured to stitch together outputs of the image sensors to produce at least one two-dimensional image comprised of a plurality of pixels;
a general dimension subsystem including general parcel dimension information; and
a fine dimensioning subsystem configured to:
  locate points on the parcel in the two-dimensional image using the general parcel dimension information,
  calculate the number of pixels from one point to another point in the two-dimensional image, and
  convert the number of pixels to a dimension measurement by determining dots per inch from the image sensors and multiplying the number of pixels calculated by the dots per inch.

19. A parcel dimension measurement method comprising:
imaging a parcel having six faces or sides using line scan cameras as said parcel is transported through a shipping or sorting tunnel system;
stitching together outputs of the line scan cameras to produce a two-dimensional image of at least one face or side of said parcel, said two-dimensional image comprised of a plurality of pixels;
determining general parcel dimension information; and
determining dimension measurements of the parcel using line scanning, the two-dimensional image and the general parcel dimension information.

20. The method of claim 19 further including:
locating points on the parcel in the two-dimensional image using the general parcel dimension information;
calculating the number of pixels from one point to another point in the at least one two-dimensional image; and
converting the number of pixels to a dimension measurement.

21. The method of claim 20 further including:
determining pixel coordinates of a point on the parcel in the least one two-dimensional image;
conducting line scans proximate said point;
calculating an average numerical value of the pixels in each line scan;
detecting a significant change in the average numerical value of the pixels of the line scans proximate the pixel coordinates of said point; and
setting the pixel coordinates of said point to pixel coordinate values where the significant change in the average numerical value of the pixels of the line scans was detected.

22. The method of claim 20 in which converting the number of pixels to a dimension measurement includes:
determining dots per inch from the line scan cameras; and
multiplying the number of pixels calculated by the dots per inch.

23. The method of claim 21 in which calculating the number of pixels from one point to another point includes determining the difference between the pixel coordinate values of the two points.

24. The method of claim 20 further including creating a mapping of said points in the two-dimensional image.

25. The method of claim 24 further including formulating from said mapping a line representing an edge of the two-dimensional image of the parcel.

26. The method of claim 21 further including conducting multi-level detection and setting of the pixel coordinates of said point using sub-sampling of the at least one two-dimensional images.

27. The method of claim 21 in which said points are located on an edge of the two-dimensional image of the parcel.

28. The method of claim 21 in which at least one point is a corner of the two-dimensional image of the parcel.

29. The method of claim 28 further including setting the pixel coordinates of four corners of the parcel in the at least one two-dimensional image.

30. The method of claim 29 further including setting the pixel coordinates of four corners of each face of the parcel.

31. The method of claim 19 in which the fine dimension measurement is a legal for trade dimension.

32. The method of claim 19 further including storing in memory the at least one two-dimensional image of the parcel.

33. The method of claim 19 further including decoding any bar codes on the parcel.

34. The method of claim 33 further including integrating and displaying bar code data and parcel fine dimension measurements.

35. A parcel dimension measurement method comprising:
imaging a parcel using image sensors;
stitching together outputs of the image sensors to produce at least one two-dimensional image comprised of a plurality of pixels;
determining general parcel dimension information;
locating points on the parcel in the two-dimensional image using the general parcel dimension information by:
  determining pixel coordinates of a point on the parcel in the least one two-dimensional image,
  conducting line scans proximate said point,
  calculating an average numerical value of the pixels in each line scan,
  detecting a significant change in the average numerical value of the pixels of the line scans proximate the pixel coordinates of said point,
  setting the pixel coordinates of said point to pixel coordinate values where the significant change in the average numerical value of the pixels of the line scans was detected;
calculating the number of pixels from one point to another point; and
converting the number of pixels to dimension measurement.

36. A parcel dimension measurement method comprising:
imaging a parcel using image sensors;
stitching together outputs of the image sensors to produce at least one two-dimensional image comprised of a plurality of pixels;
determining general parcel dimension information;
locating points on the parcel in the two-dimensional image using the general parcel dimension information;
calculating the number of pixels from one point to another point; and
converting the number of pixels to a dimension measurement by determining dots per inch from the image sensors and multiplying the number of pixels calculated by the dots per inch.

37. A parcel dimension measurement system comprising:
image sensors oriented to produce one-dimensional images a parcel;
an imaging subsystem configured to stitch together outputs of the image sensors to produce at least one two-dimensional image comprised of a plurality of pixels;
a general dimension subsystem including general parcel dimension information; and
a fine dimensioning subsystem configured to determine dimension measurements of the parcel of less than one inch using the at least one two-dimensional image and the general parcel dimension information.

38. A parcel dimension measurement system comprising:
image sensors oriented to produce a one-dimensional image of a parcel;
an imaging subsystem configured to stitch together outputs of the image sensors to produce at least one two-dimensional image comprised of a plurality of pixels;
a general dimension subsystem including general parcel dimension information;
a fine dimensioning subsystem configured to determine dimension measurements of the parcel using the at least one two-dimensional image and the general parcel dimension information; and
a bar code decoder subsystem configured to decode any bar codes on the parcel, with bar code data and parcel dimension measurements integrated and displayed.

39. A parcel dimension measurement method comprising:
imaging a parcel using image sensors;
stitching together outputs of the image sensors to produce at least one two-dimensional image comprised of a plurality of pixels;
determining general parcel dimension information;
determining dimension measurements of the parcel using the at least one two-dimensional image and the general parcel dimension information;
locating points on the parcel in the two-dimensional image using the general parcel dimension information;
calculating the number of pixels from one point to another point in the at least one two-dimensional image; and
converting the number of pixels to a dimension measurement by:
determining dots per inch from the image sensors; and
multiplying the number of pixels calculated by the dots per inch.

40. The system of claim 1 in which said fine dimensioning subsystem is configured to determine dimension measurements of less than one inch.

41. A parcel dimension measurement system comprising:
line scan cameras oriented to image a parcel;
an imaging subsystem configured to stitch together outputs of the line scan cameras to produce at least one two-dimensional image comprised of a plurality of pixels;
a general dimension subsystem including general parcel dimension information and at least one unit configured to measure general dimensions of the parcel; and
a fine dimensioning subsystem configured to determine dimension measurements of the parcel using the at least one two-dimensional image and the general parcel dimension information and to determine the parcel dimensions more precisely based on the general parcel dimension information known from the general dimension subsystem.

* * * * *